US005179862A

United States Patent [19]

Lynnworth

[11] Patent Number: 5,179,862

[45] Date of Patent: Jan. 19, 1993

[54] SNAP-ON FLOW MEASUREMENT SYSTEM

[75] Inventor: Lawrence C. Lynnworth, Waltham, Mass.

[73] Assignee: Panametrics, Inc., Waltham, Mass.

[21] Appl. No.: 546,586

[22] Filed: Jun. 29, 1990

[51] Int. Cl.[5] .................. G01F 1/66

[52] U.S. Cl. .................. 73/861.28; 73/861.29

[58] Field of Search .......... 73/861.18, 861.25, 861.26, 73/861.27, 861.28, 861.29, 861.30

[56] References Cited

U.S. PATENT DOCUMENTS

| | | | |
|---|---|---|---|
| 3,575,049 | 4/1971 | Boland | 73/194 A |
| 3,906,791 | 9/1975 | Lynnworth | 73/861.29 |
| 4,195,517 | 4/1980 | Kalinoski et al. | 73/194 A |
| 4,227,407 | 10/1980 | Drost | 73/194 A |
| 4,454,767 | 6/1984 | Shinkai et al. | 73/861.18 |

FOREIGN PATENT DOCUMENTS

WO88/08516 4/1988 World Int. Prop. O. .

OTHER PUBLICATIONS

"In Vivo Calibration of a Transit-time Ultrasound System for Measuring Ascending Aorta Volume Flow", The Pharmacologist, vol. 27-3, p. 217 (1985). J. Hartman et al.

Vessel Diameter-Independent Volume Flow Measurement Using Ultrasound, Cronelius J. Drost.

"The Transonic Flowmeter", product literature of Transonic Systems Inc., Warren Road Business Park, Ithaca, N.Y. 14850-9787.

*Primary Examiner*—Donald O. Woodiel

*Attorney, Agent, or Firm*—Lahive & Cockfield

[57] ABSTRACT

A snap-on flow measurement system includes a block which attaches to a conduit and positions at least one transducer for launching and receiving acoustic signals along a precisely defined path through a flowing fluid. In one embodiment adapted to small tubes, two transducers are coupled to the tube and launch acoustic interrogation signals along an axial path within the tube. In another embodiment adapted to larger conduits, the transducers launch oblique signals which follow a zigzag path through the fluid, reflecting off an inner wall of the conduit. In both embodiments, a channel defines a fixed position to hold the conduit aligned with the transducers.

33 Claims, 13 Drawing Sheets

295 416 415 401 402 403 391 411 412 413 420 390

390 416 415 411 417

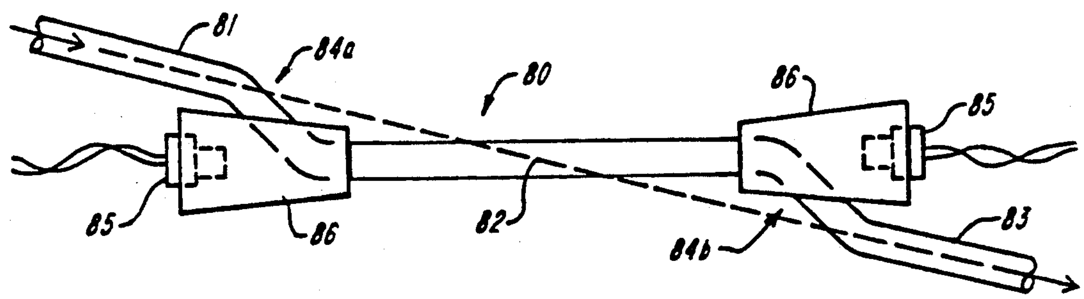
FIG. 7
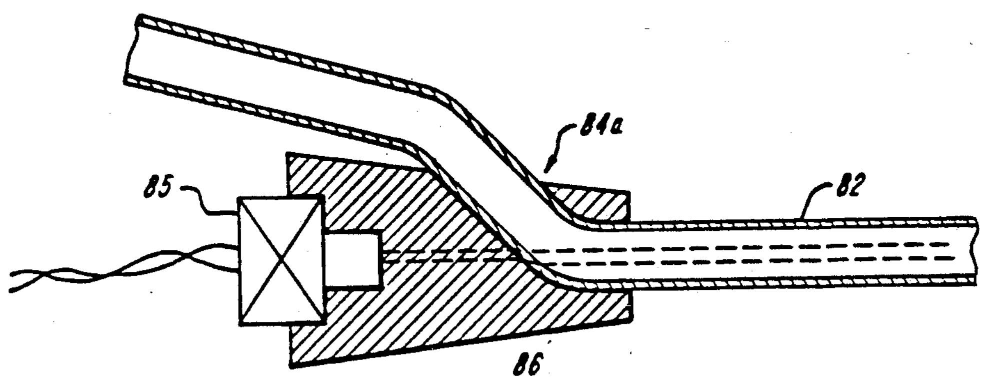
FIG. 7A
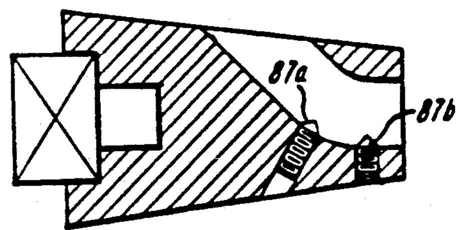
FIG. 7B
FIG. 7C
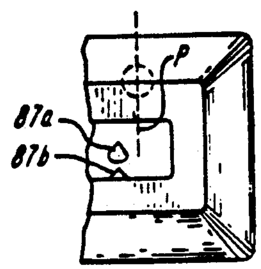

1000
1035
1036
1060
1061
1062
1020
1030
1050
1051
1052
1045
1010
1060a
1061a
1062a

SNAP-ON FLOW MEASUREMENT SYSTEM

The present invention relates to measurement of the flow or flow velocity of a fluid moving in a conduit, and more particularly relates to such measurement performed by propagating ultrasonic signals through the flowing fluid and by detecting characteristics of the transit time and amplitude of the signals so propagated. Typically, the difference in propagation time between upstream- and downstream-directed signals is detected. This difference is strictly proportional to the effective path length over which the signal is propagated in the flowing fluid. Prior art ultrasonic flow measurement systems have therefore sought to provide for the placement of transducers in relation to the conduit and flow path, so as to achieve a sufficiently long signal propagation path with an effective degree of alignment for signal propagation and detection efficiency.

For larger conduits, e.g., pipes having a diameter of ten centimeters or more, an effective path length for measuring many fluids of interest is provided by a set of transducers mounted on strap-down V-blocks or wedges which launch and receive ultrasonic signals along a folded or diagonal path that passes or is reflected obliquely across fluid flowing axially within the pipe. Refractive effects occur as the ultrasonic signal passes between the transducer wedge and the pipe wall, and between the pipe wall and the flowing fluid, so the spacing of the strap-down transducers in such a system must be set to align the transducers along a propagation path, and the path length is then calculated from the transducer spacing and pipe dimensions. The use in this manner of strap-down external transducers on larger conduits can provide an effective flow interrogation path, but requires set-up and calibration for each particular size pipe.

With smaller conduits, below several centimeters diameter, and particularly below one centimeter diameter, and especially when the conduit is metallic, diagonal interrogation with non-wetted or external transducers, if feasible, would tend to suffer from poorly defined propagation paths and crosstalk. In addition a very fine time resolution, e.g., several picoseconds to perhaps tens of picoseconds would be necessary to extract velocity-related information. Flow in smaller conduits is therefore usually measured in a different manner, by splicing a longer-path calibrated flowcell into the flow line, and measuring flow in the flowcell. This may be done, for example, by providing an axial flow tube connected by T-fittings at its ends to the flow inlet and outlet, with a transducer mounted in each T-fitting to launch and receive energy axially along the flow tube. With such constructions, however, the splice regions, e.g., T-fittings, create flow irregularities at the ends of the flowcell, and create regions where sediment or gas may collect. Flow velocity is therefore determined only after correcting the actual transducer spacing L to determine an effective flow measurement path. Thus, not only does this require a special flow segment to be inserted into the flow line, but individual calibration or correction of flow path parameters may be required.

Accordingly it is desirable to provide a simplified and effective flow measurement system adaptable to pipes and small diameter conduits.

SUMMARY OF THE INVENTION

It is an object of the invention to provide a flow measurement system which non-invasively attaches to a conduit.

It is another object of the invention to provide a flow measurement system with an effective ultrasonic path through a small diameter conduit.

It is another object of the invention to provide a flow measurement unit which quickly and releasably snaps on to an existing conduit.

These and other features of the invention are achieved in a flow measurement system wherein a block is closely fitted about a conduit and secures both the conduit and at least one transducer in precise alignment to define an ultrasonic interrogation path.

In accordance with one aspect of the invention, a first end block secures and orients a conduit with relation to a transducer in a streamlined curve such that signals from the transducer are coupled along an axial flow path within the conduit. A second, similar end block and transducer arrangement attaches to a downstream portion of the conduit and completes the assembly. The two transducers face each other, and each is capable of launching and receiving signals along the path. This provides an axial interrogation path capable of extremely fine velocity resolution usinq relatively coarse time base processing. Flexible and rigid conduits may be accurately interrogated without invasive plumbing or fixturing.

In accordance with another aspect of the invention a body or housing having a channel therein resiliently snaps onto a conduit and secures a pair of transducers against the conduit in precisely defined positions to launch and receive counterpropagating acoustic signals. The signals are propagated along diagonal interrogation paths. In various embodiments, the body includes a plurality of different contact members which may be adjustably located to center a range of different size conduits in the channel, and means for repositioning the transducers at a fixed number of discrete locations corresponding to the different size conduits centered by the contact members. The channel is open on one side, allowing the housing to snap on to conduits that are highly obstructed or are accessible from one direction only.

BRIEF DESCRIPTION OF THE DRAWINGS

These and other features of the invention will be understood from the present description, understood in light of the prior art and the claims appended hereto, together with the drawings, wherein

FIGS. 7, 7A-7F illustrate details of a flowcell embodiment of the invention and related snap-on transducer blocks;

DETAILED DESCRIPTION OF INVENTION

Figure 1A:
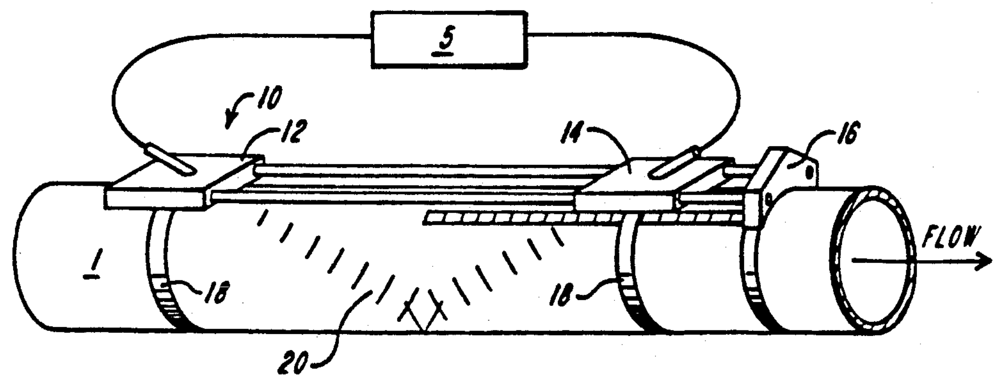
FIGS. 1A and 1B illustrate prior art flow measurement system.

The invention and its advantages are best understood in the context of prior art flow measurement systems. FIG. 1A illustrates a general flow measurement apparatus of the prior art for determining the rate of flow in a conduit 1 which may, for example, have a diameter of two and one half to fifty or more centimeters. A signal processor 5 receives signals from an assembly 10 which is fitted onto the conduit and secured in place by a clamping mechanism, illustratively straps 18. The assembly 10 includes a first wedge/transducer assembly 12 which directs an acoustic interrogation signed obliquely into the conduit 1, and a second wedge/transducer assembly 14 oriented along an oblique path in the opposite sense. Both wedge/transducer assemblies 12, 14 are adjustable to slide along a calibrated alignment frame 16, and their positions for use on a given size conduit are calculated or empirically determined to provide an interrogation path 20 of known dimension, from which transit time measurements will allow the determination of flow velocity. The oblique interrogation path 20 of these prior art strap-down systems can be tens of centimeters long, and provides good resolution of flow velocity values, as well as temporal and acoustical isolation from interfering signals propagated along the conduit wall.

Figure 1B:
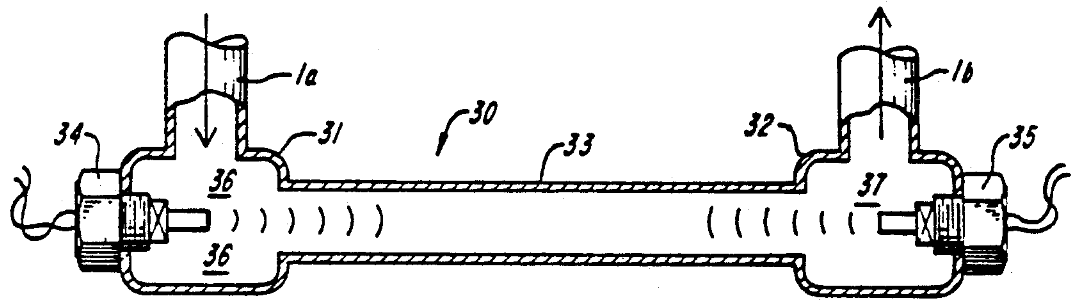

This oblique interrogation geometry with reflection from the conduit interior wall finds no application to fluid flow measurement in smaller conduits. Rather, in such conduits flow rates are conventionally measured by attaching the conduit to a flowcell. This provides a longer path length for the ultrasonic interrogation signals than could be obtained by oblique interrogation. Such a cell 30 is indicated in FIG. 1B. In this type of arrangement, the cell 30 is spliced between an inlet conduit 1*a* and an outlet conduit 1*b* via T-fittings 31, 32 so that the flow passes through a measurement passage 33 formed of a long piece of precision pipe extending between the fittings. The T-fittings 31, 32 position respective transducers 34, 35 across from the ends of pipe 33, thus providing a relatively long axially-oriented interrogation path for the transducers. This construction results in abrupt right-angle flow changes at the entrance and exit of the flow measurement tube 33, but this property does not seriously impair measurements, because the tube 33 and transducers are a rigid assembly which can be separately calibrated before installation. Nonetheless, the dead spaces 36, 37 in the T-fittings may be a problem in many situations, and the use of a spliced-in flowcell in this manner is invasive, requiring special plumbing.

Noninvasive flow measurements are made in accordance with the present invention by providing a snap-on housing that holds a transducer and positions a conduit such that the transducer is in acoustic communication with a precisely defined interrogation path.

Figure 2:
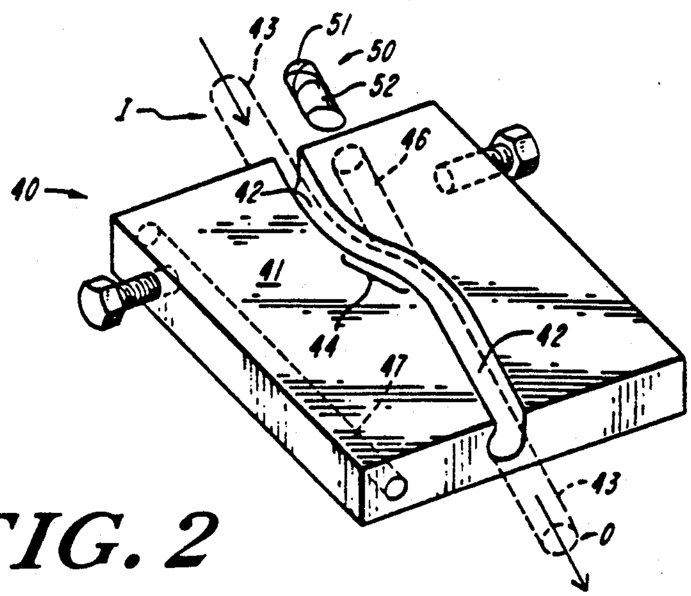
FIG. 2 illustrates one embodiment of a system according to the present invention.

As shown in FIG. 2, in one embodiment 40 adapted to small rigid or flexible tubing, a block 41 has a conduit-receiving groove 42 into which a conduit 43 (shown in phantom) fits into a precisely defined channel, and a transducer 50 launches acoustic interrogation signals along a precisely defined flow path through the tubing. The length of this flow path is large compared to the conduit inner diameter, and for contrapropagation measurements is also large compared to the transducer diameter. Groove 42 may be of keyhole cross section to tightly receive and to retain a flexible tube engaged therein. Alternatively, the tubing may be retained by a quick-acting toggle clamp, which may have a curved surface to shape a flexible tube into a precise circular cross section when the tube is secured in the block.

In the embodiment of FIG. 2, which is suitable for flexible tubing or for pre-shaped metal conduits, the groove 42 follows a smooth or streamlined curve between an entering axis "I" and an exit axis "O", forming an elbow or zig-zag 44 between the two regions. At the tip of elbow 44 a recess 46 is formed in the block to receive a transducer and position it to launch acoustic wave energy into the fluid in the tube such that the wave is launched straight along the axis "O" of the conduit.

The transducer 50 is shown removed from the recess, and is illustrated as an active transducing element 51, typically a piezoélectric crystal mounted in a stainless steel casing, and a wedge 52 which acoustically interconnects the tube and the transducing element 51. The wedge 52 may take different forms, some of which are illustrated in FIGS. 2A, 2B and 2C.

Figure 2A:
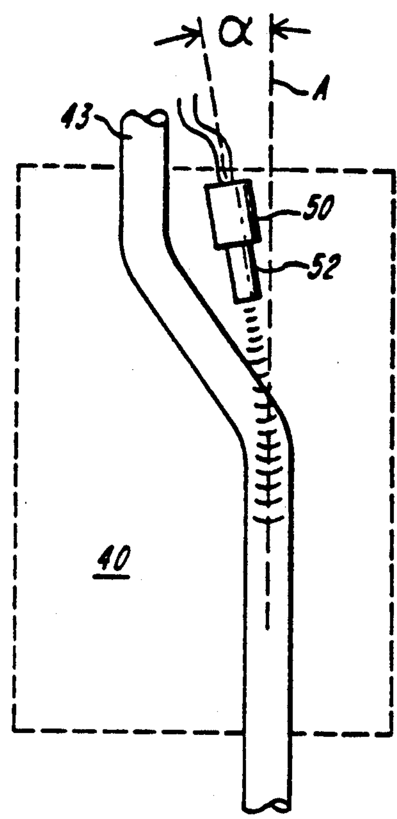
FIG. 2A-2C illustrate details of transducer coupling in the system of FIG. 2.

As shown in FIG. 2A, wedge 52 is a right cylinder formed of a material having an acoustic propagation speed $c_w$. The transducer is mounted at an angle $\alpha$ with respect to the tube straight axis A. The angle is selected in relation to the fluid sound speed, such that the interrogation signal undergoes refraction by angle $\alpha$ from the transducer axis to become parallel to the conduit axis.

Figure 2B:
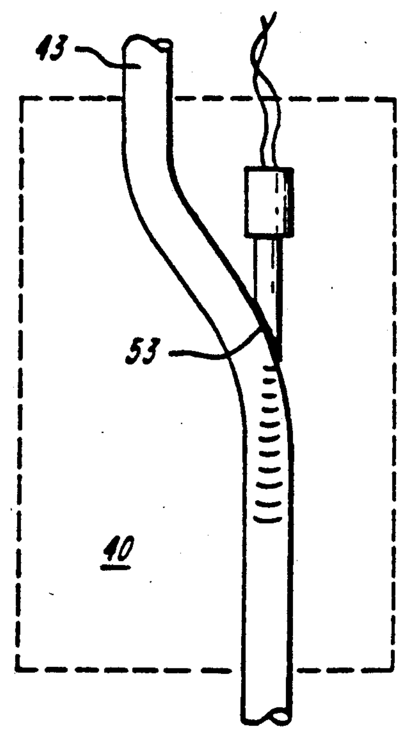

FIG. 2B shows a similar arrangement, except that the tip 53 of the wedge has a contour adapted to contact the conduit when the transducer axis T and tube axis A are aligned. In this embodiment the sound speed in the material of which the wedge is formed is selected to be approximately equal to the sound speed in the fluid within the conduit. This assures that, except for a slight lateral offset upon passing through the tube wall, the energy from transducer 50 passes in a straight direction along the tube axis.

Figure 2C:
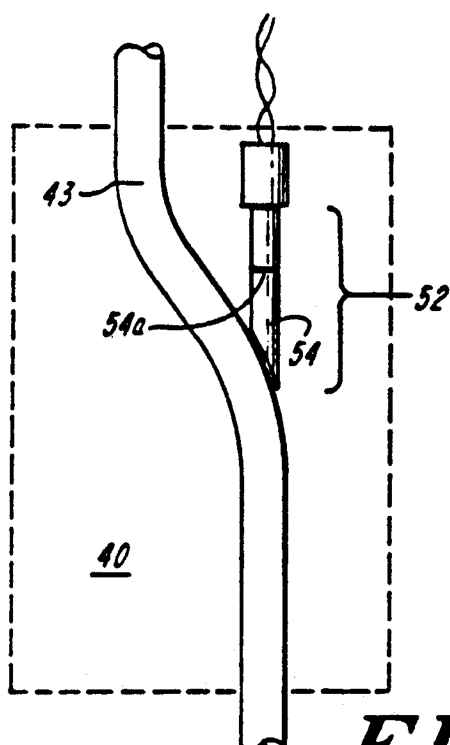

FIG. 2C shows a variation wherein the wedge 52 is formed of a right cylindrical stub which may have one acoustic speed, and a separate speed-and-contour-matching plug 54 which couples the output face of the stub to the wall of the conduit. A first face 54*a* of the plug engages the stub at right angles to its propagation axis to receive acoustic energy without refraction, and a second face 54*b* of the plug 54 closely contacts the conduit. In this embodiment, only the plug 54 need be formed of a material with a sound speed closely matching the speed of the fluid flowing in the conduit.

Figure 3:
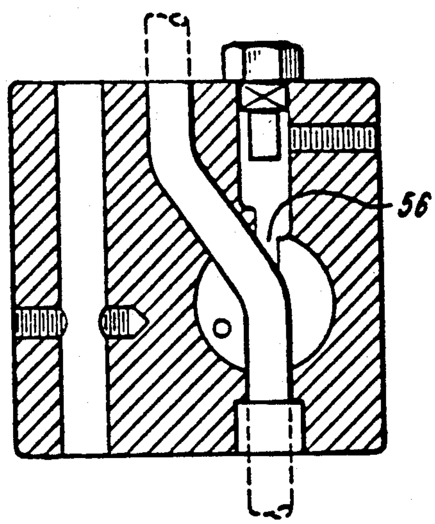
FIG. 3 illustrates another transducer coupling in a system according to the present invention.

FIG. 3 illustrates a variation on this latter approach, in which plug 54 is replaced by a fluid-filled coupling cavity 56, which is filled with a liquid having a sound speed and temperature coefficient of sound speed about the same as the fluid to be measured in the conduit. For example, when used to monitor flow of medical fluids in an IV delivery tube, the coupling cavity may be filled with a small amount of water, for coupling into a tube of dextrose or saline.

Figure 4:
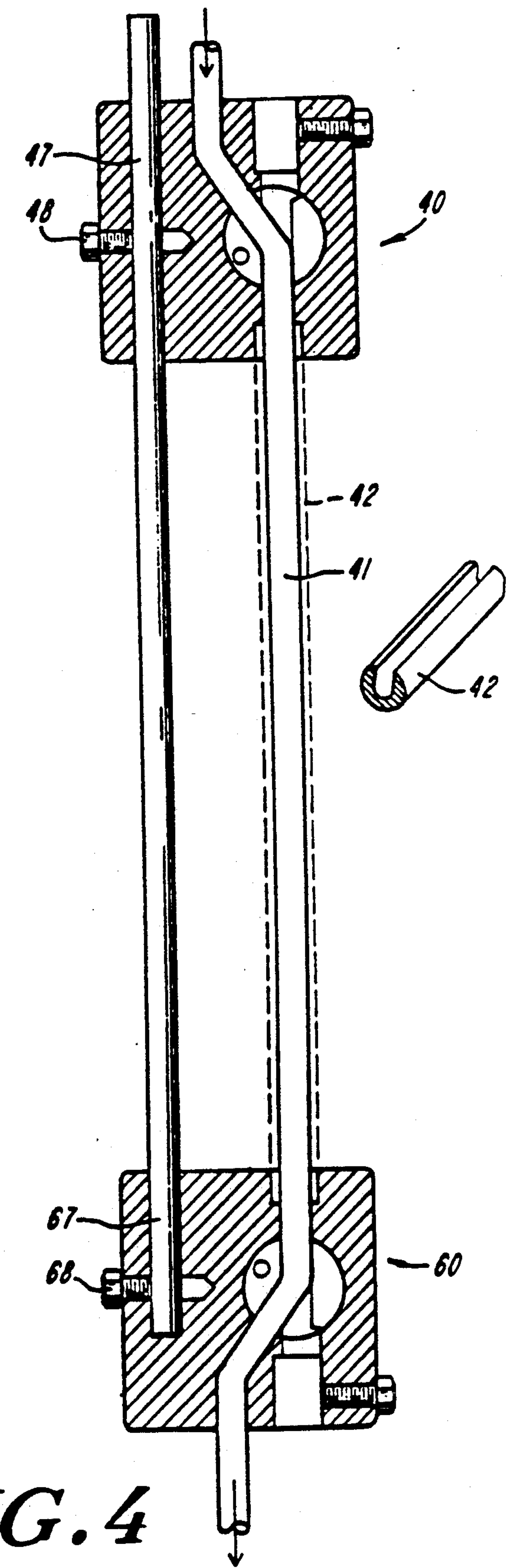
FIGS. 4 and 5 illustrate two-piece and one-piece flow measurement systems according to the invention.

It is understood that a complete system for contrapropagation measurement of ultrasonic signals comprises a second transducer block opposed to the first. FIG. 4 shows such a pair of blocks 40, 60, wherein block 40 is identical to that of FIG. 2, while block 60 shares a mirror symmetry that adapts it to fit opposite block 40 and launch signals toward it. Each illustrated block 40, 60 further has a bore 47, 67 for a receiving spacer rod to define a fixed spacing between the blocks and hence a precisely controlled interrogation path. A locking bolt 48, 68 fixes the position of the blocks along the spacer rod.

Figure 5:
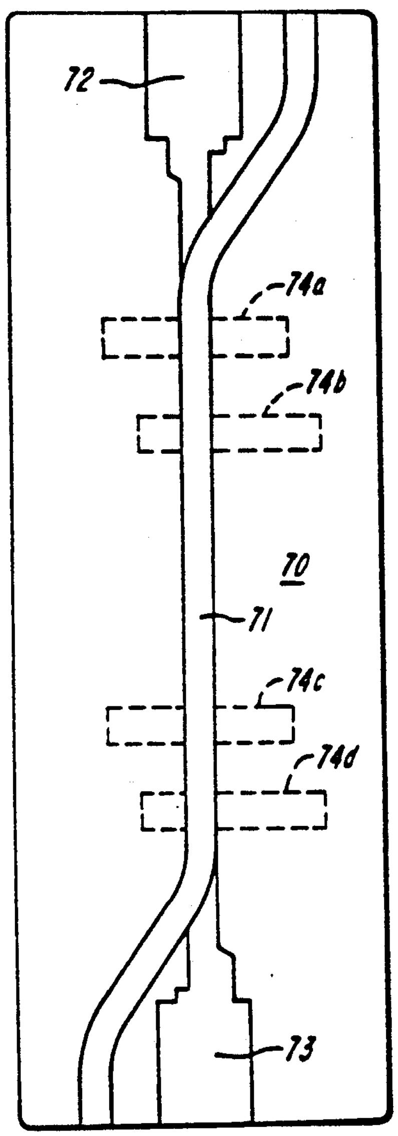

The invention also contemplates forming blocks 40, 60 as the ends of a single continuous block, with a through channel or groove securing the conduit as it passes therebetween. Such an embodiment is illustrated by snap-on or clamp-on transducer housing 70 of FIG. 5. In this embodiment, a channel 71 in the housing defines a precise interrogation path between transducers 72, 73. Optional cavities, attenuating plugs or other acoustic discontinuities *74a*, *74b*, *74c*, *74d* in the block interrupt bulk waves that otherwise would interfere as acoustic crosstalk.

Figure 6:
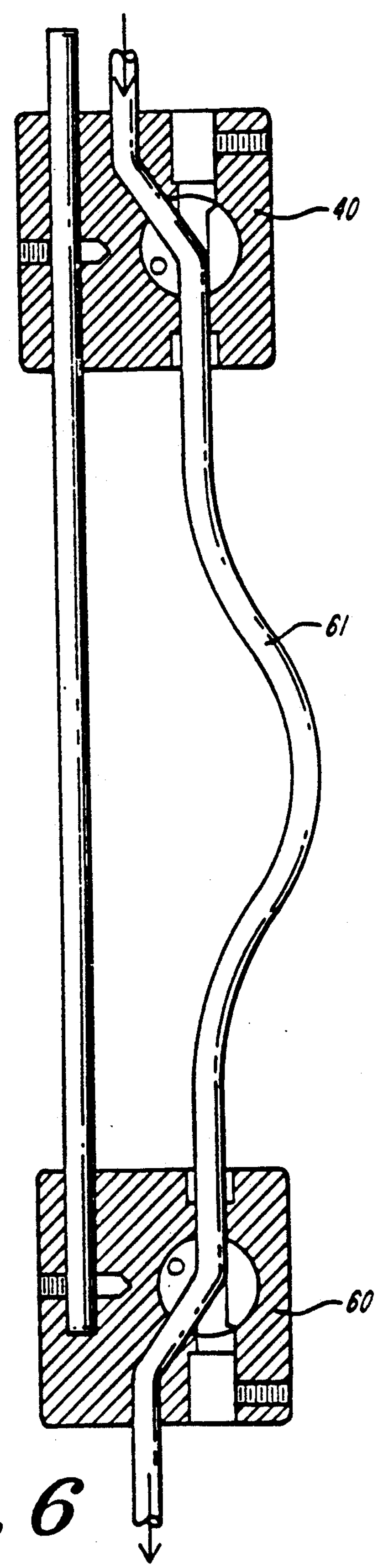
FIG. 6 illustrates a guided wave embodiment of the invention.

Applicant has found, however, that the conduit itself may guide the ultrasonic bulk wave in a guided wave mode once launched by the transducer, so that a straight tube is not strictly necessary. Thus, in the embodiment of FIG. 4, the blocks 40, 60 may be attached about a curved intermediate length of tubing 61, as shown in FIG. 6. For a flexible plastic tube of six millimeters diameter, it is desirable to provide a known and sufficiently long path length, of fifteen to thirty centimeters, to achieve a clearly discernible contrapropagation time interval $\Delta t$. The intermediate tube segment should not be too long, however, as there is a rather large percentage of fluid energy transferred to the tube wall, resulting in high attenuation of the transmitted signal.

FIG. 7 shows a further variant of the invention. In this embodiment, a flowcell 80 is configured as a specialized flow segment that may be formed in line by means of suitable conduit bending apparatus, or alternatively spliced into a normal flow line. Cell 80 includes a conduit segment having inlet portion 81, flow measurement portion 82 and outlet portion 83, each of which preferably extends parallel to a common axis. The inlet and outlet portions are preferably colinear, or are parallel with an offset, created by elbow *84c*, *84b* between each of these and the central flow portion. These elbows are formed in smooth curves such that fluid flowing around the elbow follows natural streamlines and does not form Pockets or regions of turbulence, in contrast to the prior art offset flowcell represented in FIG. 1B. At each elbow, a transducer 85 is held by a sound speed-matching potting medium, which engages the conduit and acts as a wedge 86. FIG. 7A shows a section through one of the elbows *84a* in greater detail. As illustrated, the transducer 85 is directed to launch its wave directly along the central axis of the flow measurement path 82. Coupling medium 86 holds the transducer and tube in this orientation, and the medium is selected to have a sound speed substantially equal to that of the fluid in cell 80. The dashed lines emanating from the transducer 85 indicate the beam path of the ultrasonic interrogation signals, and show the relative insensitivity of this wedge configuration to the particular pipe geometry in the elbow region. In particular, when the wedge and fluid sound speeds $C_1$ and $C_3$ are matched, the tube wall introduces only a slight offset into the signal path, of a magnitude proportional to the wall thickness and the propagation velocity in the wall. This offset is virtually negligible for thin walled metal tubes and for matched sound speed polymer tubes of any standard conduit thickness. In this context, "thin" means less than one wavelength.

Rather than a coupling medium 86 formed as a cast block, a snap-on grooved block may achieve the same results. In this embodiment, shown in FIG. 7B and further shown in end view in FIG. 7C, spring-loaded plungers *87a*, *87b* urge the conduit into a position to couple the transducer signals along an axial path.

Figure 7D:
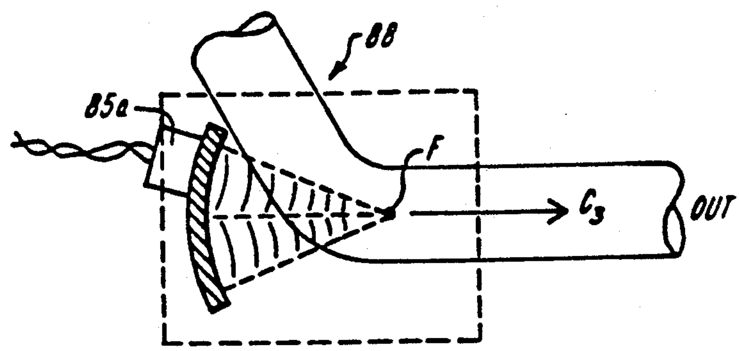

FIG. 7D shows another embodiment 88 of this transducer block, which is adapted to flow sensing in environments where the range of fluid compositions, or the range of temperature or pressure variation result in a widely varying acoustic propagation speed $C_3$. In this embodiment a focused transducer *85a* is used that has a focus F at or near the entry of the axially-extending region of the conduit. This provides a range of incidence angles in the acoustic signal so that a portion of the transducer energy will follow the axial path even when the wedge and fluid sound speeds become unmatched and vary widely with respect to each other, resulting in widely changing acoustic signal paths. In situations where the temperature varies widely (as in a heat meter application with hot and cold legs) applicant further contemplates the use of an isopaustic material, such as the ATJ graphite made by Union Carbide, to form a wedge between the transducer and the conduit.

When the fluid is of very low sound speed, say below 500 m/s (e.g., air $C_3=343$ m/sec at room temperature), obtaining a comparably-low wedge sound speed may require using shear waves in a soft material like rubber, urethane or polyethylene. In this application applicant proposes to bend the conduit close to 90 degrees, as shown in FIG. 7D. To measure flow in air or other gases, applicant has found that plastic tubing like PVC is sufficiently attenuating at 100 kHz so that acoustic feedthrough decays quickly enough in time for the gasborne signal to arrive and be detected without excessive interference. The conduit may be coated with an absorptive jacket to enhance the rate at which feedthrough is attenuated. In some cases, the feedthrough can be recorded digitally and subtracted electronically, leaving only the fluid-propagated signal.

Figure 7E:
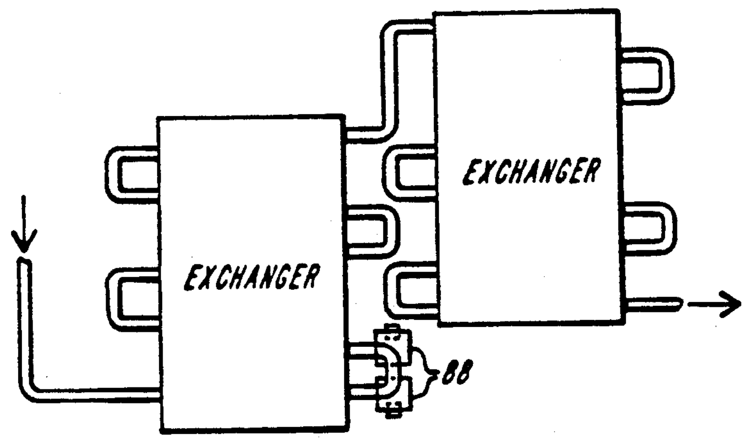

Applicant further proposes that the snap-on transducers described above may be adapted to rigid conduits that already have a nonlinear flow axis, such as a copper heat exchanger with tubing that has U-turns between straight runs passing back and forth in an apparatus. FIG. 7E illustrates such a heat exchanger with the transducers 88 of FIG. 7B or 7D attached thereto. As illustrated, a transducer block 88 conveniently fits on the only exposed segments of tubing in an otherwise occluded or covered fluid-holding assembly.

Another problem with previous clamp-on flowmeters is the difficulty of transmitting into a low sound speed fluid, such as a cryogenic liquid, along a path having a strong axial component. These fluids have a very low sound speed, causing severe refractive effects on the launching path. At cryogenic temperatures the problem is compounded by the lack of low sound speed wedge materials. This problem is addressed by one construction in accordance with another embodiment of the invention that uses a wedge made of plural dispersive elements, such as rods or sheets, operated in the lowest order asymmetric ($a_\sigma$) flexural mode. For these waves the phase velocity cf is a function of the frequency-thickness or frequency-diameter product, fd, provided d is small compared to the signal wavelength. With this construction by controlling f one controls the phase velocity of the incident wave. This also allows one to sweep frequency and thereby find an optimum incident velocity to launch the desired wave in the conduit.

Figure 7F:
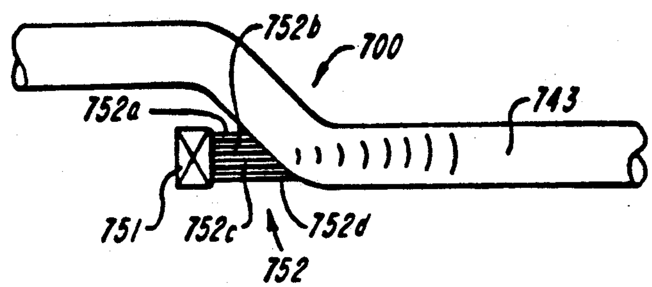

FIG. 7F shows such a wedge in an axial-flow sensing system 700 for use with a fluid of sound speed $C_3$ which is relatively low, such as liquid nitrogen, oxygen, argon or other gas. The transducer 751 is coupled to the conduit 743 by a wedge 752 consisting of a plurality of thin rods, sheets or hollow tubes 752*a*, 752*b* . . . ., each of which contacts the elbow of the conduit at a different position along its curvature. The rods, sheets or hollow tubes act as dispersive elements in which the lowest-order flexural wave is propagated at a frequency that provides a desired incident phase velocity to refract the wave into an axial path.

Figure 8:
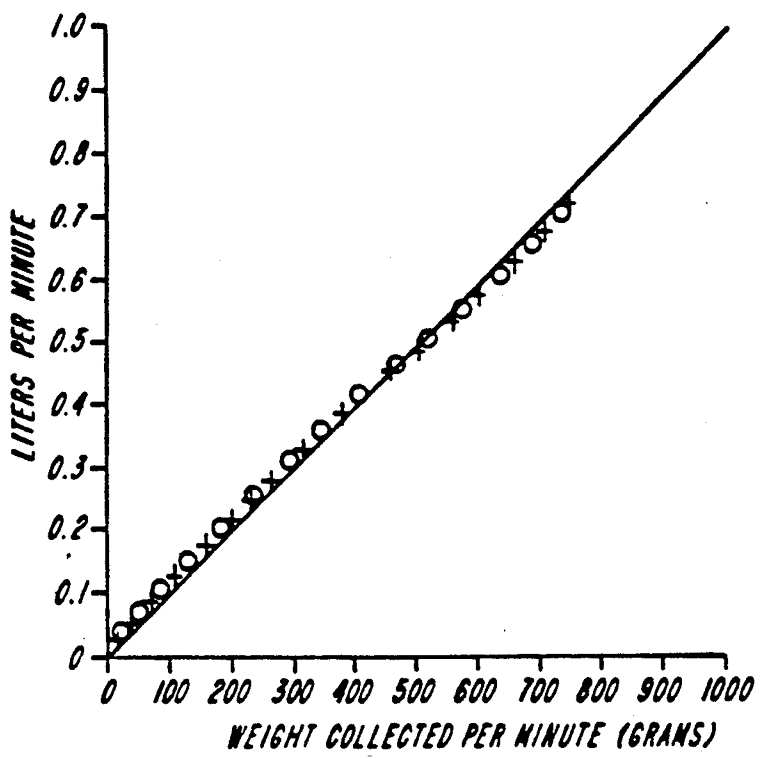
FIGS. 8, 8A are graphs of flow measurement performed with systems of the invention.

FIG. 8 is a graph of flow measurements performed on flow in a three millimeter ID soft polymer medical infusion tube using the block/transducer configuration of FIG. 4 and a Panametrics model V-323 broadband transducer operated at 2.25 MHz. The graph plots the predicted volumetric flow, derived from transit time measurements, against actual measured volumetric flow of water at 20° C. During the measurement protocol, a sequence of increasing flow rates (shown by crosses) and a sequence of decreasing flow rates (shown by circles) were employed. Accuracy within a few percent was obtained over flow rates from 10-700 cc/minute using digital signal processing with a clock frequency of 16 MHz. The deviation from linearity shown at rates above one-half liter/minute is believed to result from expansion of the unsupported middle portion of the tubing (41, FIG. 4) between the blocks 40, 60, at higher pressures. Thus, the embodiment of FIG. 5, having a closely-fitting snap-in groove to support the tube and constrain it against expansion, is expected to be more accurate in this regard. A fixed straight guide tube having a U-shaped cross-section, shown in phantom as element 42 in FIG. 4 and extending between blocks 40 and 60, accomplishes this objective.

Figure 8A:
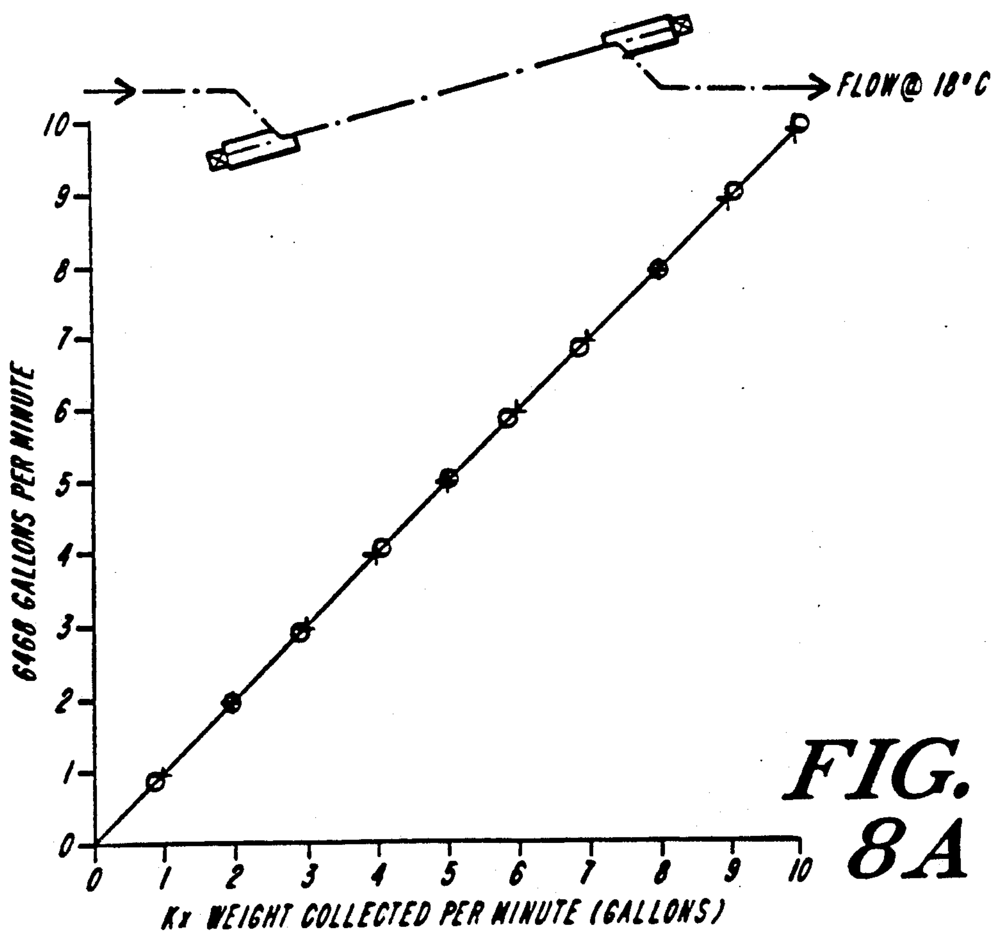

Other laboratory calibration results are plotted in FIG. 8A, for flow measurements of water at 18° C., Performed on a rigid wall conduit curved as in the construction of FIG. 7 and having an inner diameter of 0.625 inches. In this embodiment, the input and output tube segments are coaxial, and the transducer frequency is low enough 0.5 MHz) so that the steel conduit wall is thin compared to the wavelength. A wedge made of 6410 urethane and having a soundspeed C=1510 m/sec. was used to couple the transducer output into an axial path through the flowinq water. The strict linearity of the measurements of FIG. 8A further confirms the accuracy of applicant's axial interrogation transducer blocks.

The above embodiments of transducer blocks which secure a conduit in a precise configuration for performing acoustic propagation measurements have been found to be effective for rigid and for flexible conduits of various inside diameters between about three and twenty-five millimeters. For larger conduits, e.g., between approximately twenty-five and one hundred millimeter diameter, applicant has found a different snap-on block structure to be useful.

Figure 9:
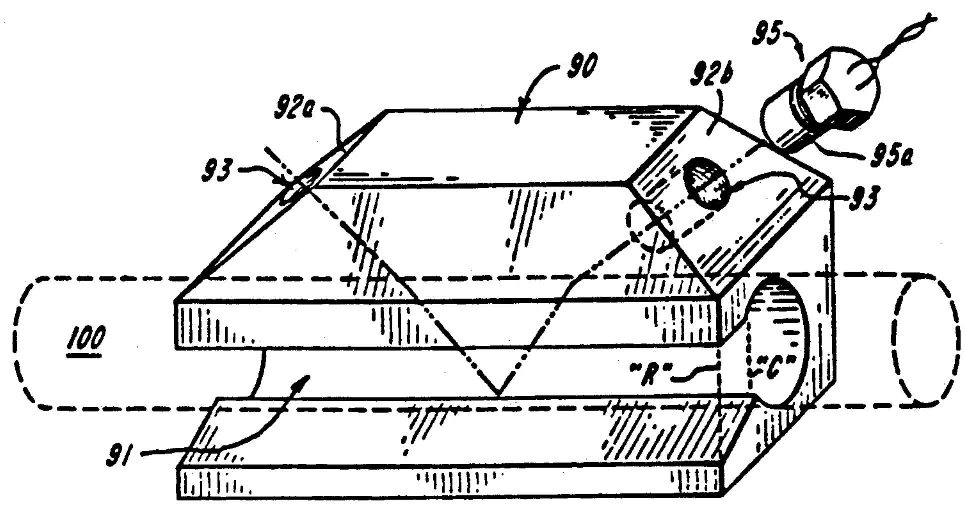
FIGS. 9, 9A illustrate snap-on transducer assemblies for larger conduits.

FIG. 9 shows one embodiment 90 of such a structure. Block 90 is a solid block having a substantially U-shaped channel 91 formed therein for fittedly receiving a conduit or pipe 100 (shown in phantom). Each of two beveled faces 92*a*, 92*b* has a preferably threaded counterbore 93 formed therein of a size to receive a transducer 95, such as a standard stainless steel encased broadband transducer made by Panametrics, Inc. of Waltham, Mass., and having an effective output/reception frequency of 500 kHz to 2 MHz. The transducer 95 includes an elastomeric or similar plug 95*a* which is urged tightly against the bottom of bore 93 to couple energy from the transducer into the body of block 90 whence it is coupled into the conduit, e.g., refracted from a direct path into an oblique, e.g., $\pi/6$ reflection path through the conduit. A two-leg path is indicated, such that the reflected acoustic wave is received by a second transducer at the same angle of incidence and located a precise distance away along the conduit.

Figure 9A:
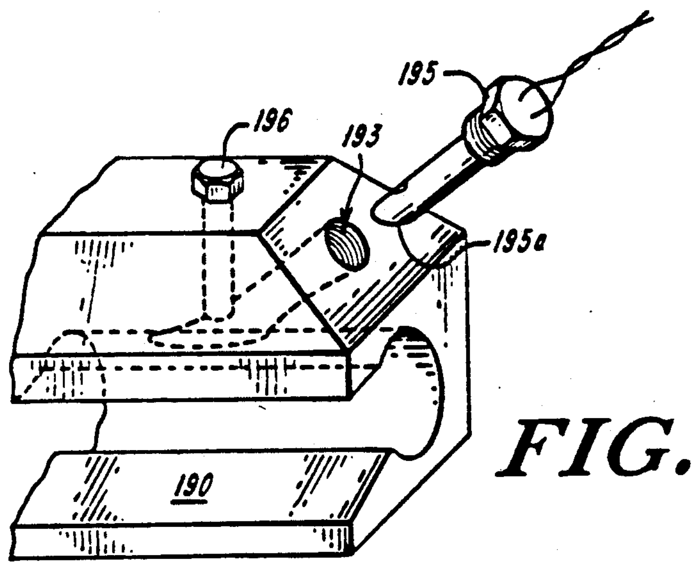

FIG. 9A illustrates a detail of an alternative transducer mounting assembly 190. In this embodiment a transducer has an elongated output nose 195 which is received in a through-hole 193 such that one end face 195*a* of the transducer assembly contacts the conduit along a line centered at the top surface of the conduit and parallel to the axis thereof. With this geometry, the ultrasonic signals are launched and received in a plane passing centrally along the conduit, so that the signal passes through the region of centerline flow and so that its propagation time is relatively unaffected by reflection from the curved portions of the conduit wall. As described in greater detail below, in some embodiments the through holes 193 are preferably enlarged to an oblong cross section at their ends, so that the transducer assembly may be moved back and forth, and may be shifted in inclination, to launch beams into flowing fluids of differing refractive characteristics, or into conduits of differing diameters which require different transducer spacings as well as different launching angles. A clamping screw 196 in this embodiment engages nose 195 in a small recess 195*b* and thereby urges the wedge end of the transducer against the conduit, and in cases where the hole 193 closely fits the nose 195, it may also act as a transducer retaining screw.

In the constructions of FIGS. 9, 9A, the body 90 is semi-rigid and the channel 91 is shown as a keyhole slot having a rounded portion consisting of slightly over $\pi$ radians of a cylindrical channel "C" with a diameter equal to the diameter of an intended conduit, and a rectilinear portion "R" consisting of a slot which attains a width slightly less than the conduit diameter. The conduit 100, shown in phantom, may be substantially inaccessible or blocked by surrounding structures, yet block 90 mounts by simply pressing against the conduit from one side, such that the block deforms and snaps around the conduit.

Figure 10:
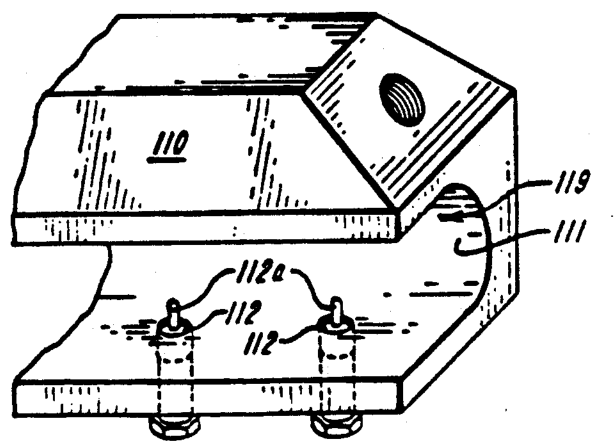
FIGS. 10-14D illustrate alternative constructions of a snap-on, transducer assembly similar to that shown in FIG. 9.
Figure 10A:
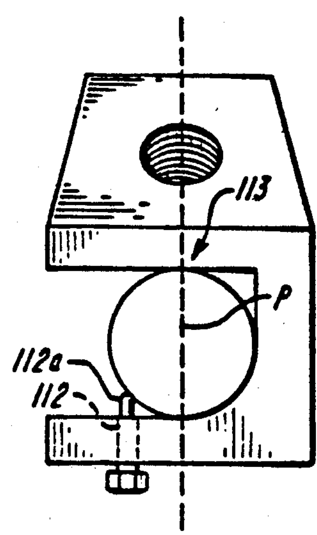

In lieu of the above embodiment, in which the undersize channel contour defines a resiliently biased snap-connection for gripping the conduit, the invention also contemplates transducer blocks having an exact or oversize alignment channel together with separate protruding elements for aligning or biasing a conduit into a defined position for signal launching. FIG. 10 shows a detail of one such embodiment 110. In this embodiment, the channel 119 is a simple U-shaped channel, of a size to Precisely receive and align Pipe 10 when the pipe is urged against the curved inner surface 111 of the channel. One or more spring-loaded pins 112 are positioned along one face of channel 119 a distance greater than the pipe radius from surface 111, and serve to spring load the pipe into alignment. FIG. 10A illustrates an end view, taken along the conduit axis. The body of pin 112 screws into the block 110, and an internal spring (not shown) biases a telescoping central pin 112*a* upward against the conduit. One of these spring-loaded pins, say the center one in a group of three, may be replaced by a thumbscrew, which when tightened a turn or two locks the assembly in proper position against the conduit.

As shown in FIG. 10A, the region 113 along which energy is coupled into and out of the conduit is preferably a flat surface, so that it contacts the conduit only along a narrow line lying in a propagation plane "P" passing centrally through the conduit and parallel to the flow axis. This assures that the measured transit time parameter substantially corresponds to the centerline flow velocity, allowing it to be readily converted to a volumetric or mass flowrate based on the known flow profile of the fluid/conduit system and physical parameters.

Figure 11:
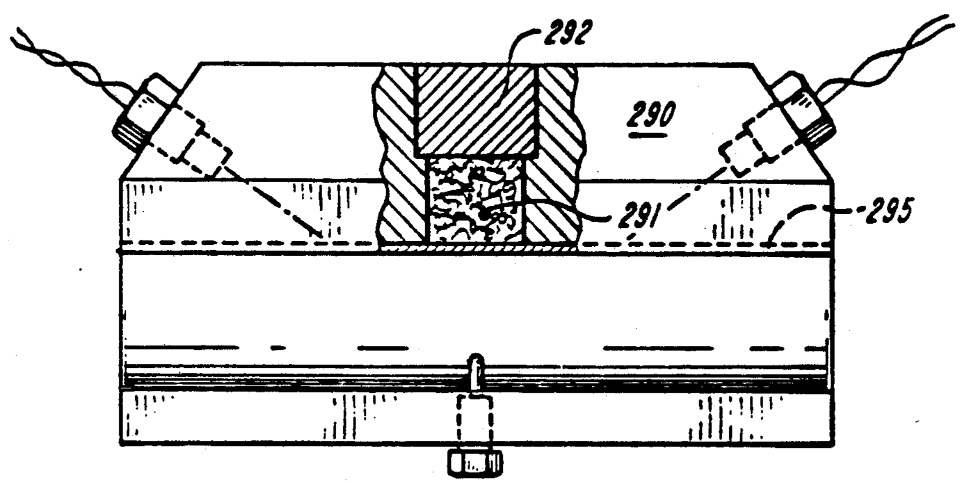
Figure 11A:
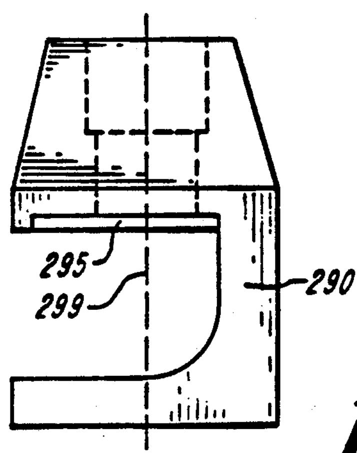

FIGS. 11, 11A illustrate preferred details of construction that extend the utility of the transducer blocks to cases where it is desirable to block and/or attenuate acoustic feedthrough between transducer regions contained within a given snap-on assembly. One construction (not shown) is to drill a series of holes perpendicular to the plane of incidence of the acoustic wave. These may be left unfilled, or filled with an attenuating compound. FIG. 11 shows the construction of a block 290 wherein a cavity generally located between the transducers, has installed therein an attenuating plug or block 291. Applicant has found that a three dimensionally reinforced graphite composite material is highly attenuating in the megahertz frequency range, yet is quite strong, able to withstand pressures of over 20000 psi even at elevated temperature, according to the specifications provided by its manufacturer, Fiber Materials, Inc. of Biddeford, Me. This three dimensional graphite composite may be nickel plated and then soldered, epoxied or otherwise cemented into the cavity. The Figure shows a retaining plug 292 which secures the packed fibrous material in the cavity.

To improve wear resistance of the snap-on assembly, a thin strip 295 of sheet metal such as stainless steel shim stock, less than about 1 mm thick, and typically 0.25 to 0.5-mm thick, is also bonded to the block so as to be tangent to the conduit when the assembly is snapped onto the conduit. It thus serves as a coupling strip and wear-resistant reinforcement.

End view FIG. 11A shows the strip 295 in relation to the mounting block body, isolation plug 291, and the central interrogation plane 299 of the conduit. To avoid the need for a liquid or a grease couplant, the strip 295 may be selected as a resilient material such as urethane, rubber or other non-rigid material capable of transmitting megahertz waves.

Figure 12:
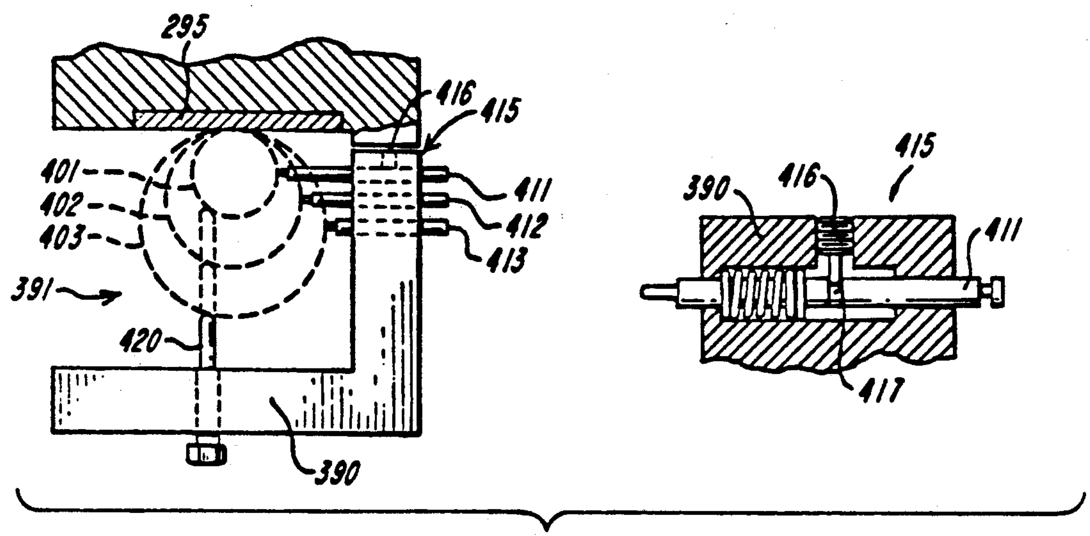

FIG. 12 illustrates another embodiment 390 or additional variation on the dual transducer mounting block and systems according to this aspect of the invention. In this embodiment, the channel 391 is adapted to receive and to secure in aligned contact with the acoustic launching surface, shim 295, any of plural different diameter conduits 401, 402, 403 each of which is shown in phantom. For example, one mounting block, rather than having the fixed keyhole channel of the embodiment of FIG. 9, may have a rectangular channel. The coupling surface defined by shim 295 or the top surface of the channel as indicated defines a face against which a conduit is urged by a plurality of parallel positioning pegs 411, 412 or 413 (one of each being shown) positioned axially along the length of the block 390, in conjunction with one or more spring loaded conduit retaining pins 420. As illustrated, each of the pins 411–413 is positioned to center its respective conduit 401–403 under strip 295, while spring loaded retaining pin 420 is located on the other side of the central interrogation plane and urges the conduit of whatever size against the plane defined by surface shim 295 and the common plane defined by the ends of pins 411, 412 or 413 so at the conduit is in true axial alignment.

The positioning pins 411–413 are retractable, so that only the pins that are required for one particular size are moved into position and extend into channel 391 at any given time. As illustrated in particular for pin 411, a mechanism 415 for releasably extending a pin into position may include a spring-loaded plunger 416 seated in a counterbore in the block 390 which bears against a circumferential groove 417 in the pin 411 when the pin is pressed in. This serves to conveniently secure one pin or set of pins at a precise extension into channel 391, and to define the fixed conduit center spacing. Alternatively or in addition, one or more of the pins 411–413 may be a threaded screw having a broad flat end plate, so that it can be screwed in to provide an arbitrary vernier edge adjustment to accommodate conduits of irregular shape or diameter, or tubes with a diameter differing from the discrete set of dimensions corresponding to Pins 411–413. FIG. 14D shows a section of device 510 having such a vernier adjustment 411*a*. Also illustrated in that Figure is a microswitch 511 which is actuated when the block is snapped onto a conduit.

Figure 13A:
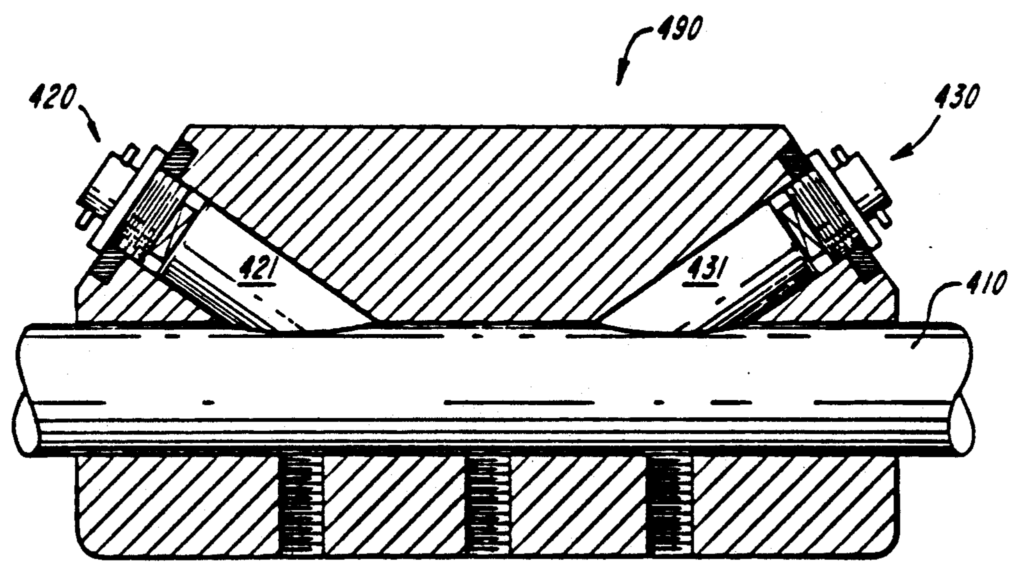
Figure 13B:
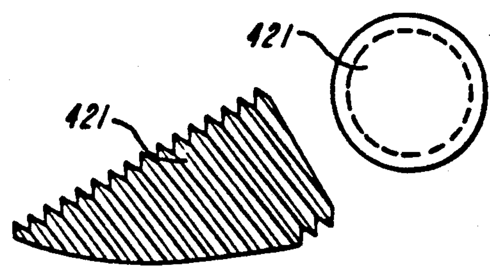
Figure 13C:
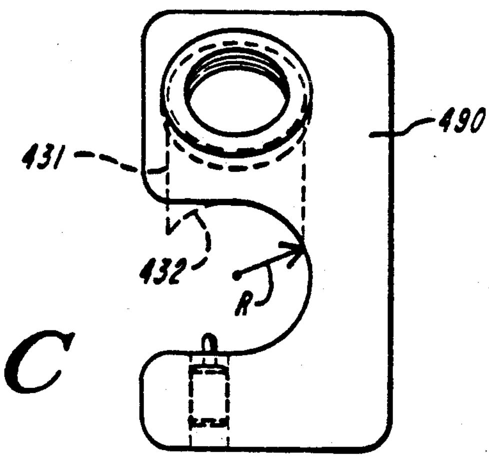

FIGS. 13A–13C illustrate details of another embodiment 490 which further adapts the previously-described constructions to flow sensing in a plastic conduit 410 of defined dimensions. In this embodiment, which by way of illustration will be described for application to a PVC conduit of fixed radius R, a channel 419 of inner radius R receives and aligns the conduit with a pair of transducer assemblies 420, 430. Each transducer assembly has a crystal which is cut and aligned to generate or receive a vertically polarized shear wave. The waves traverse respective opposed Plug wedges 421, 431 that contact the pipe at a relatively shallow angle, i.e., $\pi/3$ with respect to the normal plane, and are formed of a low-attenuation material such as a PVC composition which is also impedance matched to the conduit wall. For higher frequency operation, a lower attenuation material such as Ultem 1000 made by General Electric is preferred. For higher temperature operations, a polyimide such as Torlon of Amoco is preferred. As best seen in FIG. 13C, each plug 421, 431 is formed with a semi-curved face 422 (respectively 432) conforming to the pipe wall.

Figure 14A:
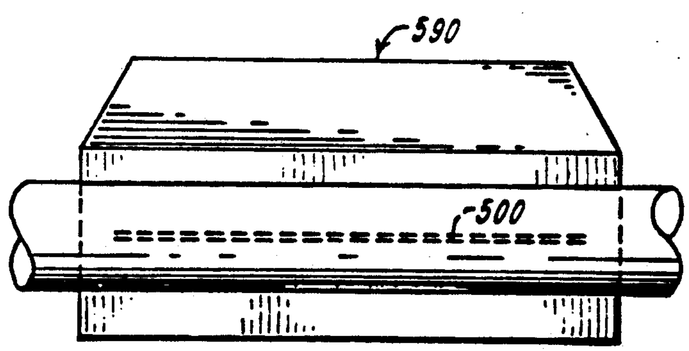
Figure 14B:
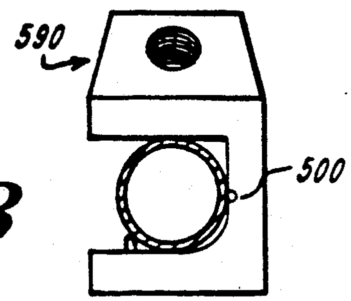
Figure 14C:
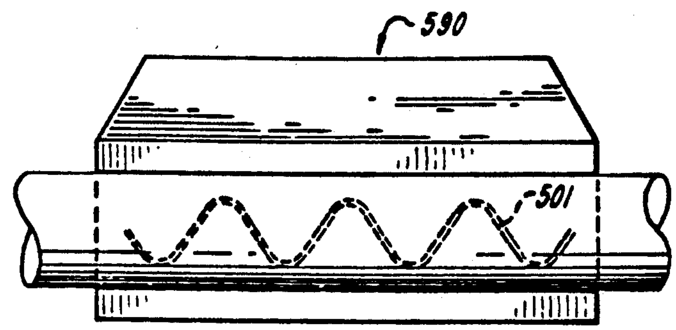
Figure 14D:
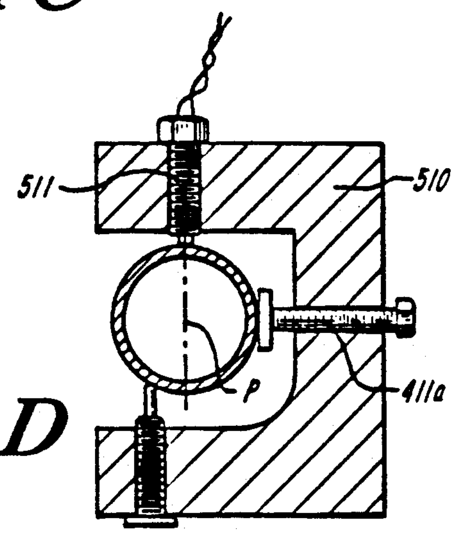

In another embodiment 590 of a snap-on transducer block, illustrated in FIGS. 14A–14C a further ultrasonic propagation path is provided outside the flow conduit in a configuration for sensing temperature by means of an ultrasonic delay line 500 in thermal contact with the conduit. The delay line is a metal wire or strip fastened around or pressed against the conduit. The wire is positioned in intimate thermal contact with the conduit, and is thermally isolated from the surrounding environment.

The delay line may consist of or be actuated by a magnetostrictive transducer, such as a Remendur rod energized by a coil at its end, and the measurement of $\Delta t$ for signals launched in the line yields a temperature value related to the change in sound speed with temperature in the line as well as its known thermal coefficient of expansion.

In the embodiment shown in FIGS. 14A, 14B, the temperature sensing element is a straight metal wire carried by the block assembly 590 and pressed against the conduit. The wire is in thermal equilibrium with the conduit and extends over a substantial length so that the derived temperature value indicates not just a local temperature but a more globally representative average temperature, which may extend axially or, in the sensor 501 shown in FIG. 14C, circumferentially. A further advantage in economy and simplicity of sensing temperature in this manner is that it uses basically the same intervalometer electronics as used for the contrapropagation flow measurement. This may be, e.g., a Panametrics Model 6468T multi-channel ultrasonic intervalometer. With a transducer block having a conduit-indicating microswitch as shown in FIG. 14D, the microswitch is preferably connected to activate the flow sensor or related process apparatus upon attachment to a conduit.

In a number of cases the speed of sound $C_3$ provides the local liquid temperature T with sufficient accuracy. At a remote pipe also in the flow path, not necessarily instrumented to measure flow velocity, the same or similar clamp could measure a second temperature value T'. The energy flowrate is then calculated as a term proportional to flow velocity V and temperature difference $T-T'$. Note that this design avoids the need for separate temperature transmitters from such devices as thermistor sensors, RTD's, thermocouples or the like. With flow measured "redundantly" at both a cold and a hot leg location, one can also check for leaks that are evidenced by a non-zero difference in mass flowrate at the two locations, since the mass flowrate at both locations should generally be identical. In such a leak detection system the mass flowrate at each location is calculated from the volumetric flowrate Q and the density that is a function of the temperature measurement at the stations.

Thus, the snap-on transducer blocks of this embodiment together with an intervalometer, constitute not just flow velocity and volumetric measuring systems, but temperature measuring systems, mass flowrate and energy transport rate measuring systems, and leakage detectors.

The invention further contemplates measuring mass flow rate by calculating the density from measurements of the flexural or bending wave velocity in the conduit. A correction for viscosity-related effects may be introduced by determining the viscosity either as a known function of a measured temperature, or as a known function of measured signal attenuation. For systems involving a two-phase fluid, the measurement of density in two different zones by flexural wave measurement provides data which, when cross-correlated, yields the flow velocity by tag cross-correlation. Multiplying density by flow velocity yield a product proportional to mass flow rate. The snap-on assembly preferably contains a plurality of transducers for measuring fluid characteristics in different ways according to how, at a given installation on a pipe, the fluid changes with time, or how conditions change as the assembly is snapped onto different pipes around a factory. The use of differing interrogation modes is discussed in the applicant's book, Ultrasonic Measurements for Process Control, Academic Press, 1989, pages 359–361 and can be effected using a multichannel Programmable intervalometer/flow meter unit, such as the aforesaid Panametrics model 6468T, connected to various ones of the transducers.

Figure 15:
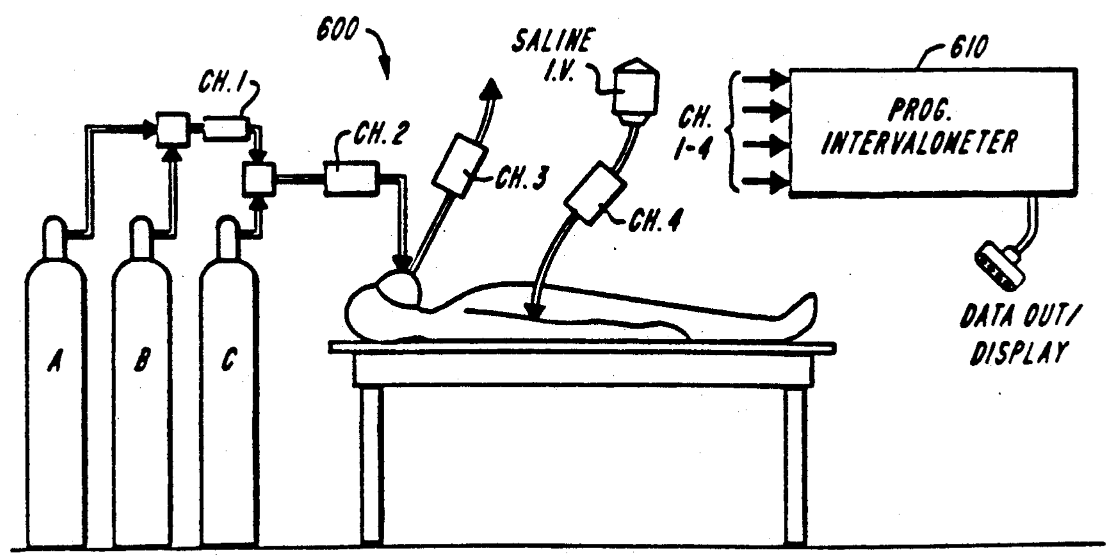
FIGS. 15, 15A and 16 illustrate multi-channel or multimode systems.

Although the main use of the snap-on transducers discussed above is to measure the characteristics of liquids, e.g., flow, it turns out that the electronics necessary to measure the flow velocity of liquids can be rather similar to that required to measure the flow velocity of gases and their sound speeds. Furthermore, the sound speed in binary gas mixtures can be related analytically or empirically to the concentration of either component in the mixture. Examples include oxygen in air; the anesthetic gas Halothane in a given nitrogen-/oxygen mixture, etc. In a hospital operating room environment, there is a need to measure intravenous fluids like saline or blood, as well as the concentration of anesthetic mixtures, and the volumetric flowrate Q of gas into and out of the patient. While not all of these individual measurements can necessarily be made to the highest accuracy subject to the constraint of snap-on transducers, several of them can now be made to sufficient accuracy by that method. Accordingly the invention further contemplates a system 600 as shown in FIG. 15. System 600 includes a multiplexed ultrasonic transit time contrapropagation flowmeter 610 such as a Panametrics Model 6468 or similar, wherein Channel 1 measures V and c according to the principles of this invention in intravenous tubing leading to a patient;

Channel 2 measures V and c of gas exhaled by the patient;

Channel 3 measures V and c in a first binary gas mixture supplied from an anesthetic source; and Channel 4 measures V and c in a second binary gas mixture (where binary here means that only one new component has been added to a known mixture such as the mixture deduced from c in Channel 3).

The amplitudes of ultrasonic waves measured in channels 1–4 provide further information such as gas pressure, or the presence of either particulate or gas bubble scatterers in the intravenous solution. Thus, FIG. 15 represents a fluid management system in a hospital or surgical environment, wherein at least one fluid parameter is measured by the snap-on and/or noninvasive axial offset path transducer blocks.

In such a system, to overcome the problem of temperature variations masking or distorting the sound speed/-composition relation in a gas mixture, one can devote one channel of an ultrasonic intervalometer (e.g., model 6468 or similar) to temperature measurement according to principles discussed in applicant's book, Ultrasonic Measurements for Process Control, Chap. 5, Academic Press, 1989. Applicant further contemplates symmetrical launching of torsional waves in the conduit by means of a piezoelectric couple at the end of a waveguide or at the end of a principal segment of a waveguide. Applicant has found that a couple is necessary to avoid launching flexural waves; further, a smaller-diameter extension can be used to secure the main waveguide, yet be damped between the diameter step and the support point.

Referring again to the hospital room fluid management system, and in particular to the gas flowcells indicated for channels 1–3, it will be understood that the flowcells may need to be sterilizable. An analogous situation occurs in industrial semiconductor fabrication facilities, where flowcells need to be baked out at high vacuum to assure cleanliness and prevent contamination of one gas or gas mixture by residues from a previous gas that might still be adhering to the walls. In both these cases it is desirable that the transducer be of low cost.

One way to manufacture a suitable gas flow transducer at low cost is to completely isolate it from the gas being measured, in the chemical sense. In other words, make the transducer as a clamp-on, or snap-on type, so the transducer never touches the gas. The principal technical difficulty is the achievement of adequate acoustic isolation. This is a problem even for wetted transducers radiating into gases, and parts of the solution to the clamp-on or snap-on problem, to be presented next, will be recognized as also applying to the wetted case.

The solution to be described combines several elements: (a) Removable tranducer(s); (b) Fixturing to assure reliable and repeatable repositioning of the transducer(s); (c) Slow-wave acoustic isolation structure; (d) Mechanical reinforcement of the slow-wave structure so as to substantially maintain its shape without suffering permanent deformation when the cell is evacuated as in bakeout procedures; (e) Quarter-wave impedance matcher eternal to the cell but attached thereto in a manner that structurally reinforces the end window(s) of the cell so that the window(s) does not permanently deform when the cell is evacuated as in bakeout procedures; (f) Attenuative material applied externally to the cell. Depending on the sound speed, impedance and attenuation of the gas to be measured, and depending on whether the cell is indeed to be evacuated and baked out, and depending on the required signal to noise ratio., not all the above elements (a)–(f) need be included. In some cases, for example, elements (d)–(f) might be omitted.

Figures 15A, 16:
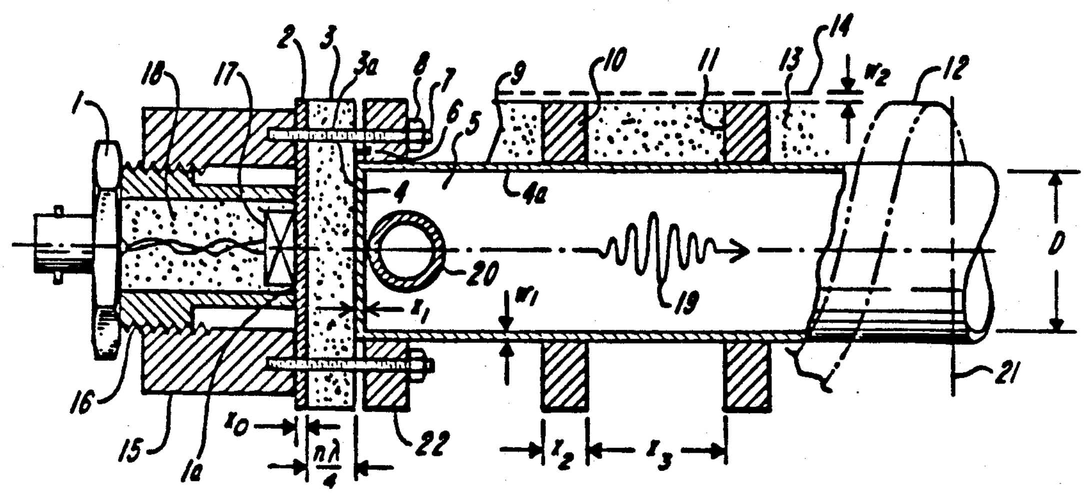

Referring specifically now to FIG. 15A which embodies all elements (a)–(f), let us trace the acoustic wave 19 of frequency f (for example, f=100 kHz) from its generation in electroacoustic element 17 within removable transducer assembly 1. The wave 19 exits from transducer assembly 1 through a housing end window 1*a*, which may be made of plastic, ceramic or metal foil, through a relatively stiff plate 2 of thickness $x_o$. Plate 2 and housing end window 1*a* are usually flat but may be slightly curved to simplify coupling or for other reasons. Plate 2 may be a stainless steel member of thickness $x_o=0.25$ mm, for example. It is coupled or bonded to quarter-wave impedance matcher 3 of thickness n $\lambda/4$ where n=odd integer and $\lambda$=wavelength in the matcher. The wave 19 next passes through cell end window 4, whose thickness $x_1$ must be small compared to wavelength. For example, at f=100 kHz, where the wavelength in SS would be about 50 mm, $x_1 \leqq 0.1$ mm would be appropriate. An end window this thin would deform if the cell were evacuated, unless the external atmospheric pressure were prevented from acting against it, or unless the window were reinforced and stiffened. In FIG. 15A, the method of stiffening consists of bonding the quarter-wave member to it, and also sealing as with an O-ring 6. Adapter 15 and plate 2 and matcher 3 are attached to an acoustically-massive ring 22 that is brazed, epoxied or otherwise bonded around the end region of the thin-wall tubular conduit 4*a* that comprises the major part of the cell 9. The attachment is accomplished by means of threaded studs 7 and nuts 8, or other conventional means. A gas entry port 20 is located near the inlet of cell 9, and another one, not shown, is symmetrically located near the other end of the symmetrical cell, symmetry being indicated by centerline 21. Gas 5 enters and exits through these ports.

As is well known, the speed of sound in most gases is much slower than in typical engineering metals like SS, and this ordinarily leads to an acoustic short circuit problem, as discussed in the applicant's book, Ultrasonic Measurements for Process Control, Academic press, chapters 3 and 4, 1989. But if the wall 4*a* is sufficiently thin ($fw_3 << 1$ MHz.mm) then acoustic energy propagating as a lowest-order asymmetric ($a_o$) flexural wave indeed propagates at a Phase velocity $c_f <$ cgas. Energy propagating in the $a_o$ mode as well as in other modes can be attenuated by intentionally introducing a multiplicity of impedance mismatches along the conduit. Samples illustrated in FIG. 15A include acoustically-massive rings 10 and 11, and an acoustically-massive spiral 12, either of which further serve as mechanical reinforcements to support the thin conduit wall during evacuation. Further attenuation of the unwanted wall-borne energy is accomplished by surrounding at least part of the conduit wall 4*a* with dampening material 13. Material 13 may be surrounded by another thin-wall tube 14 of thickness $w_2 << \lambda$. Teflon, soft elastomers, urethanes, or mixtures containing Faber-Castel "Magic Rub" eraser bits have been found to be effective absorbers for waves near 100 kHz or above. Such materials may also be used as the potting medium 18 within transducer assembly 1. The spacing $x_3$ between rings 10 and 11, or between spiral turns, would preferably be less than the pipe diameter D. The width $x_2$ is preferably on the order of a quarter wavelength of the wave to be blocked. If waves of several frequencies are to be blocked then the inter-ring spacing dimension $x_2$ ought to be different for different rings or successive turns of the spiral.

The matcher 3 may be made of Emerson and Cumming syntactic foam, or for higher temperatures above the rating of such a foam, of a low-density grade of graphite or a graphite composite formed of layers each thin compared to $\lambda/4$ and drilled with numerous small holes that do not align when the several layers comprising the matcher are sandwiched into a bonded stack. The net effect is a very porous low-density low-impedance matcher. In this case the individual layers may be electroless nickel plated and then all the layers soldered together. In these examples note that the matcher is stiff and capable of supporting pressure differentials. In this way the matcher not only impedance matches but also supports the thin window 4. The outside surface of window 4 can also be "wrung" against matcher 3 using a thin layer of oil or other acoustic couplant along interface 3*a*. In this way the window 4 can still be maintained flat, yet be removably coupled to the matcher. Note too that plate 2, while thin, can be two to ten times thicker than window 4. The reason for this is that plate 2 is on the high impedance part of the circuit, and window 4 is on the low impedance side.

The housing of transducer assembly 1 may be metallic, e.g., aluminum, SS or titanium, or may be plastic. If plastic, it is preferably shielded electrically on the inside. The housing can also contain a first impedance matching layer (not shown) of impedance $Z_o$ in which case the matcher 3 must have an impedance $Z_3 < Z_o$, as may be inferred from the work of Khuri-Yakub et al.

(1988) reviewed in applicant's aforementioned book, p. 125.

FIG. 16 shows an especially versatile snap on transducer block 1000, illustrating several other aspects of the invention, each of which may be separately implemented. In this embodiment, a block 1010 has a channel 1020 which receives and holds a conduit 1030 in a defined orientation. A first pair of transducers 1035, 1036 are positioned apart along the axis but on the same side of the conduit to launch and receive acoustic waves in a first transmission mode $V_{(1)}$, e.g., contrapropagation signals as described above in relation to FIG. 9. Another one or more transducers, indicated by transducer 1045 are positioned on an opposite side of the conduit to launch and receive signals in a second (reflection) mode $V_{(2)}$. In the illustrated embodiment, transducer 1045 receives signals launched by transducer 1035 and reflected from scatterers in the moving fluid. Transducer 1045 may also be paired with transducer 1036 and operated in a transmission mode. Three spaced transducers 1050, 1051, 1052 located in the block at different axial positions along the conduit may be actuated to transduce, i.e., generate and detect axially-propagated flexural waves in the conduit wall. In addition, three pairs of transducers 1060, 1060*a,* 1061, 1061*a,* 1062 and 1062*a,* which face each other on opposite sides of the conduit, may be actuated to transduce circumferentially propagated flexural waves in the conduit. The latter three pairs may also be actuated in a mode $V_{(3)}$ to perform tag correlation measurements. In each case, the mounting block 1010 provides a precise orientation and geometry to couple the transducers to the conduit wall such that the detected signals directly represent the measured flow, viscosity, fluid level, density or other fluid parameter.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes and variations which come within the meaning and range of equivalents of the claims are therefore intended to be embraced therein.

What is claimed is:

1. An assembly for launching or receiving ultrasonic signals in a flow measurement system that detects characteristics of fluid flowing in a conduit, such assembly comprising a transducer means for transducing electrical and mechanical energy, a transducer block having a body and means in said body for mounting the transducer means in a first defined position so as to determine a precise signal launching direction for mechanical energy coupled to or from the transducer means, said body further including a channel extending therethrough and means located therein for automatically releasably engaging and resiliently biasing a conduit in a second defined position when the conduit is inserted in the channel, said first and second defined positions determining a precisely defined signal path for entry of signal energy into said conduit and calculation of propagation time of energy therein.

2. An assembly according to claim 1, wherein the means in said body for mounting the transducer includes means for varying at least one of transducer mounting depth and transducer mounting angle.

3. An assembly according to claim 1, wherein the conduit is a flexible conduit and said body has a curved channel formed therein to bend the conduit such that a signal generated by the transducer means is refracted into a straight path through fluid flowing in the conduit.

4. An assembly for launching or receiving ultrasonic signals in a flow measurement system that detects characteristics of fluid flowing in a conduit, such assembly comprising transducer means for transducing electrical and mechanical energy, a transducer block having a body and means in said body for mounting the transducer in a first defined position so as to determine a precise signal launching direction for mechanical energy coupled to or from the transducer, said body further including means located therein for releasably engaging and securing a conduit in a second defined position wherein said means for releasably engaging includes a precision channel formed in said body having a positioning surface defining the conduit's positon, and means in said body elastically biasing the conduit in position said first and second defined positions determining a precisely defined signal path for entry of signal energy into said conduit and calculation of propagation time of energy therein.

5. An assembly according to claim 4, including two transducers mounted in opposed positions to launch and receive signals therebetween along a precision path determined by the body.

6. An assembly according to claim 5, wherein the transducer block includes first and second block segments positioned about a spacer.

7. An assembly according to claim 6, wherein the first and second blocks and the spacer are integral portions of a single elongated body.

8. An assembly according to claim 6, wherein said first and second block segments are ends of a single housing which secures said conduit such that a central straight portion defines and acoustic flow measurement path.

9. An assembly according to claim 6, wherein the body secures a tube in a curve and acoustic signals are axially guided by the tube.

10. An assembly according to claim 6, wherein the conduit is a flexible tube and a said block segment includes a contoured groove into which the tube releasably fits and is positioned by the groove to assume a defined flow path along which the acoustic signals are axially coupled.

11. An assembly according to claim 10, further comprising a wedge which couples a said transducer to the tube, said wedge being characterized by a sound speed selected, in relation to the sound speed in fluid flowing in the tube, to refract an acoustic wave in said wedge to an axial path in said tube.

12. An assembly according to claim 10, wherein the tube in an elastically extensible tube having dimensions which expand with increasing fluid pressure, and the contoured groove constrains the tube to have a substantially constant dimension thereby enhancing accuracy of flow rate measurements.

13. An assembly according to claim 5, wherein the means in said body elastically biasing the conduit includes elastomeric material in said precision channel for flexing open to receive the conduit and thereafter returning elastically to a closed position biased against the conduit.

14. An ultrasonic transducer assembly comprising a body, an elongated channel formed in said body, said channel having an axis and being defined by side walls spaced from said axis and including means for resiliently and releasably receiving a conduit and holding the conduit aligned along the axis, and a pair of transducer elements for launching and receiving counterpropagating signals through a fluid flowing in the conduit when the conduit is held in said channel, and mounting means for positioning each of said pair of transducers symmetrically such that the conduit is resiliently biased against each transducer and the signals reflect off an inner wall of the conduit along a precisely defined signal path therebetween.

15. An ultrasonic transducer assembly according to claim 14, wherein said channel has an arcuate contour conforming to a conduit outer wall, and resilient means biases the conduit against said arcuate contour.

16. An ultrasonic transducer assembly according to claim 15, wherein said arcuate contour comprises a curved wall extending more than x radians of arc along a radius substantially equal to the radius of the conduit, whereby the conduit snaps into the channel and is resiliently held thereby in contact with the body.

17. An ultrasonic transducer assembly according to claim 14, further comprising positioning means extending inwardly of said channel to define contact points which position any of plural different size conduits in axial alignment with said channel, and biasing mean for urging any of said plural different conduits into contact with corresponding positioning means such that the conduit extends axially along the channel in acoustic contact with said transducer elements.

18. An ultrasonic transducer assembly according to claim 17, the mounting means positions the transducer elements at any of a plurality of discrete positions, respective pairs of positions being located to propagate signals along symmetric reflection paths between the transducers through conduits of different sizes positioned in said channel by said positioning means.

19. An ultrasonic transducer assembly according to claim 17, wherein the positioning means comprises a vernier adjustment for continuously varying a contact point to precisely center an irregular conduit with respect to a transducer.

20. An ultrasonic transducer assembly according to claim 14, wherein the transducer elements include crystals adapted to launch ultrasonic waves of two different modes.

21. An ultrasonic transducer assembly according to claim 14, wherein the transducer elements launch vertically polarized shear waves into the conduit via contoured wedges which conform to an exterior wall of the conduit.

22. An ultrasonic transducer assembly according to claim 14, wherein the pair of transducer elements are mounted in positions for launching and receiving wave energy along a vertical a plane passing centrally along the axis of the conduit.

23. An ultrasonic transducer assembly according to claim 14, comprising transducers positioned to effect tag cross-correlation measurements of fluid flowing in the conduit.

24. An ultrasonic transducer assembly according to claim 14, comprising transducers positioned to effect measurements of acoustic signals received in a reflection mode from fluid flowing in the conduit.

25. An ultrasonic transducer assembly comprising a body, an elongated channel formed in said body, said channel having an axis and side walls adapted for receiving a conduit and holding the conduit aligned along the axis, means included in said body for automatically securing the conduit in alignment when it is inserted in said channel and for elastically biasing the conduit against a transducer, and mounting means for mounting the transducer in said body and positioned to determine a precision propagation path with respect to fluid in said conduit such that ultrasonic signals launched by and received by said transducer couple along a defined path whereby analysis of the signals enables direct calculation of a characteristic of fluid in said conduit.

26. An ultrasonic transducer assembly according to claim 25, wherein said transducer is positioned to launch and receive bulk wave energy along an axial flow path through said fluid.

27. An ultrasonic transducer assembly according to claim 25, wherein said transducer is positioned to launch and receive via the conduit wall guided wave energy, propagation of which varies with the density of fluid contained in the conduit.

28. An ultrasonic transducer assembly according to claim 25, wherein said transducer is positioned to launch and receive via the conduit wall wave energy which reflects off the fluid in said conduit.

29. An ultrasonic transducer assembly according to claim 25, wherein said body has mounted therein plural transducers Positioned for performing tag correlation measurements of fluid flowing axially along the conduit.

30. An ultrasonic transducer assembly according to claim 25, wherein said body has at least three transducers mounted therein that are not all on the same side of the channel.

31. An ultrasonic transducer assembly according to claim 25, wherein ones of said transducers operate in a transmission mode and a reflection mode.

32. An ultrasonic transducer assembly according to claim 30, wherein ones of said transducers operate in a transmission mode and a reflection mode.

33. An ultrasonic tranducer assembly according to claim 25, further comprising electrical switching means mounted in said body and extending into said channel, for activation by a conduit held in said channel.

* * * * *